US007925072B2

(12) United States Patent
Chen et al.

(10) Patent No.: US 7,925,072 B2
(45) Date of Patent: Apr. 12, 2011

(54) METHODS FOR IDENTIFYING ARRAY AREAS IN DIES FORMED ON A WAFER AND METHODS FOR SETTING UP SUCH METHODS

(75) Inventors: Chien-Huei (Adam) Chen, San Jose, CA (US); Ajay Gupta, San Jose, CA (US); Richard Wallingford, San Jose, CA (US); Kaustubh (Kaust) Namjoshi, Sunnyvale, CA (US); Mike Van Riet, Morgan Hill, CA (US); Michael Cook, Windsor Berkshire (GB)

(73) Assignee: KLA-Tencor Technologies Corp., Milpitas, CA (US)

(*) Notice: Subject to any disclaimer, the term of this patent is extended or adjusted under 35 U.S.C. 154(b) by 1069 days.

(21) Appl. No.: 11/683,696

(22) Filed: Mar. 8, 2007

(65) Prior Publication Data

US 2008/0219545 A1 Sep. 11, 2008

(51) Int. Cl.
*G06K 9/00* (2006.01)
(52) U.S. Cl. ........ 382/145; 382/144; 382/141; 382/147; 382/148; 382/151; 356/394; 356/388; 356/429
(58) Field of Classification Search .................. 382/145, 382/144, 141, 147, 148, 151; 356/388, 394, 356/429
See application file for complete search history.

(56) References Cited

U.S. PATENT DOCUMENTS

| | | | |
|---|---|---|---|
| 4,579,455 A | 4/1986 | Levy et al. | |
| 4,845,558 A | 7/1989 | Tsai et al. | |
| 5,521,987 A | 5/1996 | Masaki | |
| 6,104,835 A | 8/2000 | Han | |
| 6,650,779 B2 | 11/2003 | Vachtesvanos et al. | |
| 6,804,381 B2 | 10/2004 | Pan et al. | |
| 6,855,381 B2 | 2/2005 | Dietrich et al. | |
| 6,865,288 B1 | 3/2005 | Shishido et al. | |
| 6,930,782 B1 | 8/2005 | Yi et al. | |
| 6,947,587 B1 | 9/2005 | Maeda et al. | |
| 7,065,239 B2 | 6/2006 | Maayah et al. | |
| 7,142,992 B1 | 11/2006 | Huet et al. | |
| 2002/0028013 A1 | 3/2002 | Sawa et al. | |
| 2003/0076989 A1 | 4/2003 | Maayah et al. | |
| 2004/0054432 A1 | 3/2004 | Simmons | |

(Continued)

FOREIGN PATENT DOCUMENTS

EP 16308962 3/2006

(Continued)

OTHER PUBLICATIONS

U.S. Appl. No. 11/561,735, filed Nov. 20, 2006, Kulkarni et al.

(Continued)

*Primary Examiner* — Mike Rahmjoo
(74) *Attorney, Agent, or Firm* — Ann Marie Mewherter (57) ABSTRACT

Methods for identifying array areas in dies formed on a wafer and methods for setting up such methods are provided. One method for identifying array areas in dies formed on a wafer includes comparing an array pattern in a template image acquired in one of the array areas to a search area image acquired for the wafer. The method also includes determining areas in the search area image in which a pattern is formed that substantially matches the array pattern in the template image based on results of the comparing step. In addition, the method includes identifying the array areas in the dies formed on the wafer based on results of the determining step.

9 Claims, 5 Drawing Sheets

U.S. PATENT DOCUMENTS

| | | | |
|---|---|---|---|
| 2004/0156539 | A1 | 8/2004 | Jansson et al. |
| 2005/0062963 | A1 | 3/2005 | Yoshida et al. |
| 2005/0104017 | A1* | 5/2005 | Kimba et al. ............ 250/559.07 |
| 2006/0062445 | A1 | 3/2006 | Verma et al. |
| 2006/0138343 | A1* | 6/2006 | Nakasuji et al. ......... 250/440.11 |
| 2007/0280526 | A1 | 12/2007 | Malik et al. |

FOREIGN PATENT DOCUMENTS

| | | |
|---|---|---|
| JP | 01086529 | 3/1989 |
| WO | WO 02/086804 | 10/2002 |

OTHER PUBLICATIONS

U.S. Appl. No. 11/680,152, filed Feb. 28, 2007, Chen et al.
U.S. Appl. No. 11/561,659, filed Nov. 20, 2006, Zafar et al.
International Search Report and Written Opinion for PCT/US08/55232 mailed on Jul. 4, 2008.
International Search Report and Written Opinion for PCT/US08/56212 mailed on Jul. 31, 2008.

* cited by examiner

METHODS FOR IDENTIFYING ARRAY AREAS IN DIES FORMED ON A WAFER AND METHODS FOR SETTING UP SUCH METHODS

BACKGROUND OF THE INVENTION

1. Field of the Invention

This invention generally relates to methods for identifying array areas in dies formed on a wafer and methods for setting up such methods. Certain embodiments relate to identifying array areas in dies formed on a wafer based on areas in a search area image acquired for the wafer that are determined to substantially match an array pattern in a template image or one or more attributes of texture in a training image.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Wafer inspection using either optical or electron beam imaging are important techniques for debugging semiconductor manufacturing processes, monitoring process variations, and improving production yield in the semiconductor industry. With the ever decreasing scale of modern integrated circuits (ICs) as well as the increasing complexity of the manufacturing process, inspection becomes more and more difficult.

In each processing step performed on a semiconductor wafer, the same circuit pattern is printed in each die on the wafer. Most wafer inspection systems take advantage of this fact and use a relatively simple die-to-die comparison to detect defects on the wafer. However, the printed circuit in each die may include many areas of patterned features that repeat in the x or y direction such as the areas of DRAM, SRAM, or FLASH. This type of area is commonly referred to as an array area (the rest of the areas are called random or logic areas). To achieve better sensitivity, advanced inspection systems employ different strategies for inspecting the array areas and the random or logic areas.

Examples of inspection systems configured for array area inspection are described in commonly assigned U.S. Pat. No. 4,845,558 to Tsai et al., which is incorporated by reference as if fully set forth herein. In the systems described by Tsai et al., generally, the system adjusts the zoom of an image sensor such that each cell of an array pattern in the array area fits exactly into some integer number of pixels. The system then performs a cell-to-cell comparison by simply shifting the image sensor one cell away on the wafer and acquiring an image at the shifted location. This array inspection strategy can achieve much higher sensitivity in array areas than random inspection because it avoids noise caused by die-to-die variation and the residue error of image interpolation when registering one die image to another die image that have different image sizes.

To set up a wafer inspection process for array inspection, many currently used inspection systems require users to manually define the array areas of a die. This step is commonly referred to as care area setup, where the care areas (or the areas that the user cares about) are the array areas. Since modern chip design is getting more and more complex, the number of care areas and the complexity of their layout continues to increase. As a result, users may have to spend hours in defining the array care areas. Some users, due to the lack of time, simply skip the array care area setup and inspect the array area in random mode, thus losing the sensitivity entitlement provided by the inspection system.

Furthermore, in the manual method, the user may have to setup thousands of care areas for array region/geometry manually. Even with some user interface (UI) helper functions for copying and filling care areas, manual care area setup is still a tedious and error-prone process. For example, there is always a possibility that the user will draw the care areas inaccurately and/or mistakenly include page breaks in the care areas. Care area inaccuracy can reduce the care areas included in the inspected area by missing some care areas during the inspection, and missing page breaks results in "blowups" during the inspection. In order to fix the blowup problem, the user has to redefine the care areas or remove the page breaks from the care areas thereby further increasing the overall recipe setup time quite significantly.

Examples of methods for attempting to automate the care area setup are described in U.S. Pat. No. 7,065,239 to Maayah et al., which is incorporated by reference as if fully set forth herein. In the methods described in this patent, generally, the array areas are detected as part of a defect detection algorithm. To find array areas in an image, the image is divided into relatively small blocks and an array-metric is determined for each block. The array-metric represents the likelihood that the block includes an array pattern. The method then applies a pre-defined threshold to the metric to classify each block as an array or random block. Finally, the method merges connected array blocks into array areas.

There are, however, several drawbacks to the methods described in this patent. For example, the array-metric used in these methods may not be a strong discriminator for some array patterns. Therefore, the classification of array blocks may be relatively inaccurate thereby resulting in error in the identification of the array areas. In addition, the spatial resolution of the identified array areas is limited by the size of the blocks. Furthermore, the array area finding is performed during run-time. Therefore, if there are any errors in the array area identification, users will not have the chance to verify and correct the errors. In addition, since this array area finding is performed at run time instead of during setup, these methods increase the time required to run wafer inspections thereby reducing the throughput (e.g., number of wafers inspected per hour) of the inspection system.

Accordingly, it would be advantageous to develop methods for identifying array areas in dies formed on a wafer and methods for setting up such methods, which can be used to automatically identify array areas in the dies on the wafer, and which can reduce care area setup time from hours to minutes thereby greatly improving the ease of use of inspection systems and achieving the maximum sensitivity entitlement for inspection of array areas provided by the inspection systems.

SUMMARY OF THE INVENTION

The following description of various method embodiments is not to be construed in any way as limiting the subject matter of the appended claims.

One embodiment relates to a computer-implemented method for identifying array areas in dies formed on a wafer. The method includes comparing an array pattern in a template image acquired in one of the array areas to a search area image acquired for the wafer. The method also includes determining areas in the search area image in which a pattern is formed that substantially matches the array pattern in the template image based on results of the comparing step. In addition, the method includes identifying the array areas in the dies formed on the wafer based on results of the determining step.

In one embodiment, the array pattern is resolved in the template image and the search area image. In another embodiment, the comparing step includes pattern matching, and the determining step includes applying a threshold to results of the pattern matching.

In one embodiment, the method includes acquiring the search area image by acquiring a swath of image data in a first direction across the wafer and acquiring a swath of image data in a second direction across the wafer. The second direction is substantially perpendicular to the first direction. In another embodiment, the method includes acquiring the template image during a first scan of the wafer and acquiring the search area image during a second scan of the wafer. In an additional embodiment, the search area image includes images of two or more of the array areas separated by one or more page breaks.

In one embodiment, the identifying step includes determining a difference histogram using one or more of the areas in the search area image located at different positions in the search area image, determining a threshold based on the difference histogram, and expanding one or more of the areas in the search area image using the threshold. In another embodiment, the identifying step includes projecting the areas in the search area image onto an axis and determining discontinuities in the areas projected onto the axis as page breaks extending in a direction substantially perpendicular to the axis.

In one embodiment, all steps of the computer-implemented method are performed automatically. In some embodiments, the template image and the search area image are acquired using bright field imaging.

Each of the steps of the method embodiments described above may be performed as described further herein. Each of the embodiments of the method described above may include any other step(s) of any other method(s) described herein. The embodiments of the method described above may be performed using any of the systems described herein.

Another embodiment relates to a different method for identifying array areas in dies formed on a wafer. The method includes comparing one or more attributes of texture in one or more training images acquired in one of the array areas to one or more attributes of texture in one or more search area images acquired for the wafer. The method also includes determining areas in the one or more search area images in which the one or more attributes of the texture substantially match the one or more attributes of the texture in the one or more training images based on results of the comparing step. In addition, the method includes identifying the array areas in the dies formed on the wafer based on results of the determining step.

In one embodiment, an array pattern is not resolved in the one or more training images and the one or more search area images. In some embodiments, the method includes acquiring the one or more search area images by acquiring one or more swaths of image data in a first direction across the wafer and acquiring one or more swaths of image data in a second direction across the wafer. The second direction is substantially perpendicular to the first direction. In another embodiment, the method includes acquiring the one or more training images during a first scan of the wafer and acquiring the one or more search area images during a second scan of the wafer. In an additional embodiment, the one or more search area images include images of two or more of the array areas separated by one or more page breaks.

In one embodiment, the method includes filtering the one or more search area images prior to the comparing step to remove noise from the one or more search area images. In another embodiment, the determining step includes comparing the results of the comparing step to one or more thresholds determined based on one or more statistics of the one or more attributes of the texture in the one or more training images, respectively.

In one embodiment, the identifying step includes determining one or more difference histograms using one or more of the areas in the one or more search area images located at different positions in the one or more search area images, determining one or more thresholds based on the one or more difference histograms, and expanding one or more of the areas in the one or more search area images using the one or more thresholds. In another embodiment, the identifying step includes projecting the areas in the one or more search area images onto an axis and determining discontinuities in the areas projected onto the axis as page breaks extending in a direction substantially perpendicular to the axis.

In one embodiment, all steps of the computer-implemented method are performed automatically. In some embodiments, the one or more training images and the one or more search area images are acquired using bright field imaging.

In a different embodiment, the one or more training images and the one or more search area images are acquired using dark field imaging. In one such embodiment, the one or more training images include different training images acquired in a training block on the wafer using different optical conditions, and the one or more search area images include different search area images acquired in a search area on the wafer using different optical conditions. In one embodiment, the different optical conditions include imaging with and without one or more Fourier filters. In some such embodiments, the comparing step includes comparing the one or more attributes of the texture in a first of the different training images with the one or more attributes of the texture in a first of the search area images acquired at the same optical conditions and comparing the one or more attributes of the texture in a second of the different training images with the one or more attributes of the texture in a second of the search area images acquired at the same optical conditions. In one such embodiment, the determining step includes determining the areas as areas in both of the first and second different search area images in which the one or more attributes of the texture substantially match the one or more attributes of the texture in the first and second different training images, respectively. In some such embodiments, the identifying step includes identifying substantially accurate boundaries of rectangles corresponding to the array areas in the dies formed on the wafer based on the results of the determining step and only one of the different search area images.

Each of the steps of the method embodiments described above may be performed as described further herein. Each of the embodiments of the method described above may include any other step(s) of any other method(s) described herein. The embodiments of the method described above may be performed using any of the systems described herein.

An additional embodiment relates to a computer-implemented method for setting up a method for identifying array areas in dies formed on a wafer. The computer-implemented method includes determining if an array pattern in a training image acquired in one of the array areas is resolved. The computer-implemented method also includes determining that template matching should be used in the method for identifying the array areas if the array pattern is resolved. In addition, the computer-implemented method includes determining that texture matching should be used in the method for identifying the array areas if the array pattern is not resolved.

Each of the steps of the computer-implemented method embodiment described above may be performed as described further herein. The embodiment of the computer-implemented method described above may include any other step(s) of any other method(s) described herein. The embodiment of the computer-implemented method described above may be performed using any of the systems described herein.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

The terms "first" and "second" are used herein to differentiate between different directions, scans, etc. The terms "first" and "second" are not used to indicate temporal, spatial, or preferential characteristics of the directions, scans, etc.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

The embodiments described herein generally relate to methods and systems for automatically finding array areas and page breaks for semiconductor wafer inspection applications. For example, one embodiment relates to a computer-implemented method for identifying array areas in dies formed on a wafer. In some embodiments, the method includes acquiring a training image in one of the array areas formed on the wafer and a search area image for the wafer.

In one embodiment, the array pattern is resolved in the training image and the search area image. Obviously, the array pattern that is resolved in the training and search area images will vary depending on the device design, the process or processes performed on the wafer prior to imaging, and interactions between the device design and the process or processes performed on the wafer prior to imaging. Preferably, in this embodiment, the array pattern is imaged in the training and search area images with sufficient resolution such that template matching of the array pattern can be performed as described further herein. In one such embodiment, the template image and the search area image are acquired using bright field (BF) imaging. Acquiring the template and search area image using BF imaging may be performed as described further herein.

In some embodiments, the training image is acquired in a training block in a die formed on the wafer. A portion of the training image acquired in the training block may be used as a template image as described further herein. In this manner, if the array pattern is resolved in the training image, the array pattern will also be resolved in the template image. However, the training image itself may be used as the template image for template matching as described herein.

Figure 1:
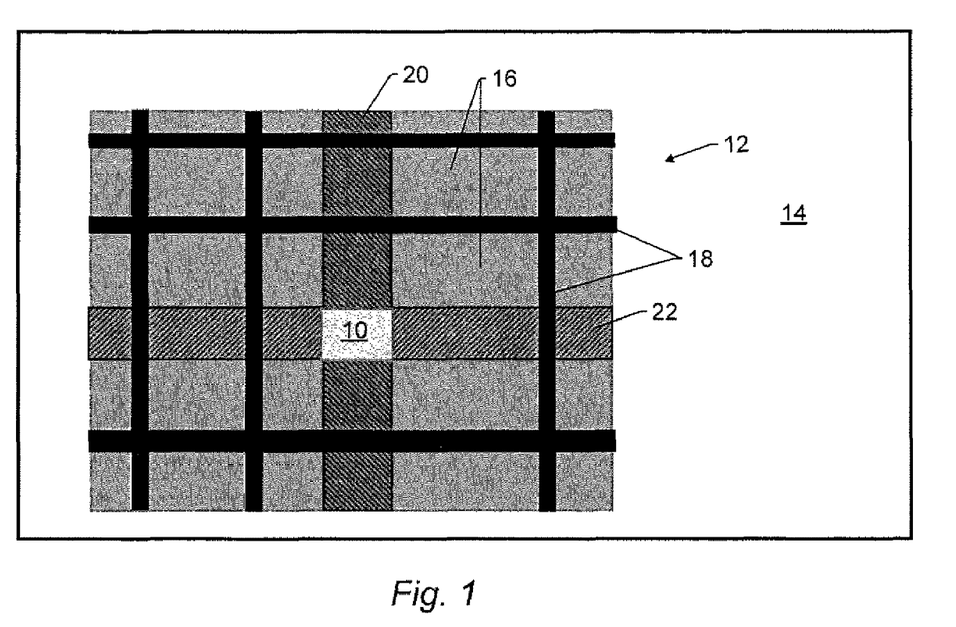
FIG. 1 is a schematic diagram illustrating a top view of one embodiment of a training image selected in an array area of an array block in a die formed on a wafer and two swaths scanned across the wafer in two substantially perpendicular directions.

A user of the method embodiment may select the training block. The user may select the training block as any rectangle (or square) in an array area of a die in which the array pattern is formed. For example, as shown in FIG. 1, a user may select training block 10 within array block 12. As shown in FIG. 1, array block 12 is located within die 14. In addition, array block 12 includes array areas 16 and page breaks 18. Array block 12 is the array region in which the page breaks and array areas are to be identified as described further herein (e.g., in which the page breaks and array areas need to be drawn). In some embodiments, the user selects or defines the array block or the array region in which the page breaks and/or array areas need to be drawn. In some such embodiments, an entire die (e.g., die 14) may be selected as an array block.

As further shown in FIG. 1, the user may select training block 10 well inside one of array areas 16 included in the array block. The training block may be selected well inside the array area to ensure that the training block includes only the array pattern formed in the array area. In this manner, the user may define the training block, which includes only array geometry. In addition, although FIG. 1 shows the training block selected within one particular array area included in the array block, the training block may be selected in any of the array areas included in the array block. The training block selected by the user can be used to train a core array detection algorithm, which can be used for identifying the array areas as described further herein.

In one embodiment of a manual method for selecting the training block, the user may select the training block from design data for the device being formed on the wafer. Alternatively, the user may select the training block by manually controlling an inspection subsystem to view different areas of one or more dies formed on a wafer and positioning the field of view of the inspection subsystem above the selected training block and accepting the area within the field of view as the training block to be used in the method.

The user may also select the search area(s) to be used in the method. In this manner, the user may define search area(s) in which the method will be used to identify the array areas. In particular, the user may define a search area (which may contain thousands of array blocks as well as page breaks) within which the user is interested in having the method automatically find array blocks and/or page breaks. Page breaks are generally defined in the art as regions of a die separating substantially continuous regions of physical memory. Each of the continuous regions of physical memory may be commonly referred to as a page frame. The search area(s) selected by the user may include an entire area of a die on the wafer or some portion of the area of the die on the wafer. The search area(s) may be selected by the user in any suitable manner.

As described further herein, search area image(s) may be acquired for the entire search area selected by the user or only a portion of the search area selected by the user. Preferably, the search area image includes sufficient information about the array areas and the page breaks such that the array areas can be distinguished from the page breaks as described further herein. For example, in some embodiments, the search area image includes an image of at least a portion of two or more of the array areas separated by at least a portion of one or more page breaks. In this manner, each search area image may preferably include groups of array areas that are separated by page breaks.

In some embodiments, the computer-implemented method may include acquiring the training image, the search area image, and any other images described herein by imaging the wafer. In one such embodiment, the method includes acquiring the training image, search area image, and any other images described herein by optical imaging. In a different embodiment, the method includes acquiring the training image, search area image, and any other images described herein by electron beam imaging. Optical and electron beam imaging may be performed using a system configured as described herein. In addition, the computer-implemented method may include acquiring the training image, the search area image, and any other images described herein without imaging the wafer (e.g., by acquiring such images from another method or system that generated the images).

The training image, the search area image, and any other images described herein may be any images that can be acquired for a wafer (e.g., a patch image, a swath image, etc.). In addition, the training image, the search area image, and any other images described herein may have any suitable image format known in the art. In other words, the methods described herein are not limited by the type of images or image data that can be used in the methods. In particular, the images described herein may include any appropriate type of images.

In some embodiments, the method includes acquiring the training (or template) image during a first scan of the wafer and acquiring the search area image during a second scan of the wafer. For example, the embodiments may include two types of scans, which are referred to herein as a training scan and a finding scan, and the user may specify a relatively small care area (or training block) for the training scan as described above. In this manner, the embodiments described herein are capable of performing training and finding scans for the identification of array areas.

Acquiring the training and search area images in the embodiments described herein may be performed manually, automatically, or semi-automatically (e.g., user-assisted). In one embodiment of a manual method for acquiring a training image, a user may select the training image from one or more images acquired in a preliminary scan of the wafer. In one embodiment of a user-assisted method for acquiring the training image, the user may select the training block to be used in the method from a representation of design data such as graphical design stream (GDS) data of the device to be formed on the wafer. The method may include determining an estimated location of the selected training block on the wafer (e.g., using the design data, the position of the training block within the design data, a layout for the dies on the wafer, any other relevant information, or some combination thereof). The method may also include acquiring an image of the wafer at the estimated location and presenting the acquired image to the user such that the user can accept or reject the acquired image as the training image.

The training scan may be initiated automatically by software or a system configured to perform one or more steps of the method. In the training scan, the method may include acquiring the training image by imaging an area on a wafer in which the array pattern in one of the arrays areas of the dies is formed. For example, the method may include using a selected training block to acquire an image of the training block in the training scan of the wafer.

As described herein, the training block may be selected by a user. Alternatively, the training block may be selected automatically by the embodiments described herein. For example, acquiring the training image may include determining a location of a training block on the wafer. In one such example, the method may include using the design of the device, the layout of the dies on the wafer, any other relevant information, or some combination thereof to estimate a location of an array pattern on the wafer. The method may also include positioning an inspection subsystem and/or the wafer such that the inspection subsystem can acquire an image at the estimated location.

To verify that the training image has been acquired at a location within one of the array areas, the training image may be compared to the design (e.g., a simulated image that illustrates how the design will be printed on the wafer, which may be generated using methods and systems such as those described in commonly assigned U.S. patent application Ser. No. 11/226,698 filed Sep. 14, 2005 by Verma et al., published on Mar. 23, 2006 as U.S. Patent Application Publication No. 2006/0062445, which is incorporated by reference as if fully set forth herein). Such a comparison may be performed as described herein (e.g., using template matching). If the method determines that the array pattern in the training image substantially matches the design for the array pattern, then the method may include verifying the training image as acquired in one of the array areas.

Alternatively, a pattern recognition technique and/or a set of rules may be applied to an image acquired at an estimated location of an array area on the wafer to determine if the image has been acquired in the array area of a die on the wafer. For example, one or more parameters of the pattern recognition technique and the set of rules may be defined based on the design for the array area of the die such that the pattern recognition technique or the set of rules can be used to distinguish between array areas in the die and non-array areas in the die. A method and/or algorithm used for the pattern recognition technique or the set of rules may have any suitable configuration known in the art. In this manner, if results of the pattern recognition technique or the set of rules indicate that the array pattern appears in the acquired image, then the method may include verifying the acquired image as the training image.

The method may also include acquiring more than one training image in different array areas and/or different dies on the wafer. More than one training image may be combined (e.g., by aligning the images to each other and then averaging the images) to generate a composite training image that can be used as the training image in the embodiments described herein. The composite training image may be used in the methods described herein to reduce noise in the training image (e.g., from random defects that appear in the training image) to thereby increase the accuracy of the methods.

The training scan may include training the core array detection algorithm using one or more images contained in the training image. For example, the training scan may be executed such that the algorithm can automatically extract one or more algorithm parameters to be used during the finding scan described further herein. During the training phase of the method, the method may include determining which algorithm (template or texture matching) should be used in the finding phase, which is described further herein. This step may be performed using the core algorithm. A template matching algorithm is preferably used for array patterns that can be resolved. A texture matching algorithm is preferably used for non-resolvable array patterns. The template and texture matching algorithms may be configured and used as described further herein.

In this manner, the training phase may include setting up (at least a portion) of a method for identifying array areas in dies on the wafer. One embodiment of a computer-implemented method for setting up a method for identifying array areas in dies formed on a wafer includes determining if an array pattern in a training image acquired in one of the array areas is resolved. Determining if the array pattern in the training image is resolved may be performed in any suitable manner. For example, a pattern recognition technique may be applied to the training image. If the pattern recognition technique does not fail, then the array pattern may be determined to be resolved in the training image. If the pattern recognition technique fails, then the array pattern may be determined to be not resolved in the training image. In another example, one or more characteristics such as contrast of the training image may be determined and used to determine if the array pattern is resolved in the training image. The one or more characteristics may be determined in any suitable manner known in the art.

The computer-implemented method embodiment described above may include automatically determining the algorithm (template or texture matching) that should be used during the finding scan (e.g., using a training algorithm). For example, the computer-implemented method includes determining that template matching should be used in the method for identifying the array areas if the array pattern is resolved in the training image. Template matching may be performed as described herein. In addition, the computer-implemented method includes determining that texture matching should be used in the method for identifying the array areas if the array pattern is not resolved in the training image. Texture matching may be performed as described herein.

In one embodiment, all steps of the computer-implemented method described above are performed automatically. The embodiment of the computer-implemented method described above may include any other step(s) of any other method(s) described herein. The embodiment of the computer-implemented method described above may be performed using any of the systems described herein.

A finding scan may be initiated by software or a system configured to perform one or more steps of the method. In addition, the finding scan may be initiated by a user. For example, a user may click a "find page breaks" button displayed in a user interface (not shown) by software or a system configured to perform one or more steps of the method. The finding scan may include acquiring the search area image or images. For example, in one embodiment, the method includes scanning the wafer to acquire images of one or more search areas, which may be defined by the user as described above or selected automatically as described above.

In some embodiments, the method includes acquiring the search area image by acquiring a swath of image data in a first direction across the wafer and acquiring a swath of image data in a second direction across the wafer. The second direction is substantially perpendicular to the first direction. As such, the embodiments described herein may include scanning the wafer to acquire a horizontal swath image and a vertical swath image in the finding scan. The finding scan may include acquiring one horizontal swath image and one vertical swath image for identifying vertical and horizontal page breaks, respectively. For example, as shown in FIG. 1, the finding scan may include scanning vertical swath 20 to acquire a vertical swath image that can be used to find horizontal page breaks. In addition, the finding scan may include scanning horizontal swath 22 to acquire a horizontal swath image that can be used to find vertical page breaks.

In some embodiments, the horizontal swath has a width that is approximately equal to the width of the search area and a height that is approximately equal to the height of the training block. For example, as shown in FIG. 1, horizontal swath 22 may have a width that is approximately equal to the width of array block 12 and a height that is approximately equal to the height of training block 10. In some such embodiments, the vertical swath has a width that is approximately equal to the width of the training block and a height that is approximately equal to the height of the search area. For example, as shown in FIG. 1, vertical swath 20 may have a width that is approximately equal to the width of training block 10 and a height that is approximately equal to the height of array block 12.

The finding scan may also include automatically identifying array areas inside the search area(s). The core array detection algorithm (for template or texture matching) may be invoked as part of the finding scan. The core algorithm is basically configured to distinguish the array pattern from a non-array pattern and to output a list of rectangles specifying the array areas. In addition, the methods described herein may include identifying the page breaks and generating a list of rectangles specifying the page breaks. The method may also include grouping the rectangles specifying the page breaks into a separate region from the array areas.

In one embodiment, the method includes comparing an array pattern in a template image acquired in one of the array areas to a search area image acquired for the wafer. In this manner, in some embodiments, the comparing step includes template matching or "pattern matching." In particular, the methods described herein may use pattern matching techniques to automatically identify the array areas in a die.

The method may include using a template matching algorithm or method for comparison and detection of relatively well-resolved array patterns. For example, results of comparing the array pattern in the template image to a search area image may be used as described herein to determine if the array pattern in the template image substantially matches one or more patterned features in the search area image. In this manner, the method may include performing pattern matching to identify areas in the search area image that substantially match the template image.

Since the search area image(s) are image(s) of a larger area of the die than the template image, the comparing step may be performed such that the template image can be compared to different areas within the search area image(s). In this manner, the comparing step may effectively include scanning the template image over the search area image(s). In other words, the method may include "sliding" the template image around in the search area image until all areas of the search area image have been compared to the template image.

Pattern matching technologies have been used in many different applications. Some examples of currently available pattern matching techniques include summing of the squares of the differences (SSD), normalized cross correlation (NCC), as well as feature extraction and then feature based matching. Examples of SSD methods are illustrated in U.S. Pat. Nos. 4,579,455 to Levy et al., 6,930,782 to Yi et al., and 6,947,587 to Maeda et al., which are incorporated by reference as if fully set forth herein. Examples of NCC methods are illustrated in U.S. Pat. Nos. 5,521,987 to Masaki and 6,865,288 to Shishido et al., which are incorporated by reference as if fully set forth herein. Examples of feature extraction methods are illustrated in U.S. Pat. Nos. 6,104,835 to Han, 6,650,779 to Vachtesvanos et al., 6,804,381 to Pan et al., and 6,855,381 to Okuda et al., which are incorporated by reference as if fully set forth herein. For techniques that are relatively sensitive to image brightness/contrast such as SSD, image brightness/contrast correction schemes have also been developed such as the gray level correction (GLC) method. Examples of methods that can be used for gray level correction are illustrated in U.S. Patent Application Publication No. 2005/0062963 by Yoshida et al., which is incorporated by reference as if fully set forth herein. Such technologies have been used in inspection tools for tasks such as wafer alignment and field/die registration. The methods described herein, however, are believed to be the first applications in which pattern matching technology is used to setup care areas for wafer inspection applications.

Figure 2:
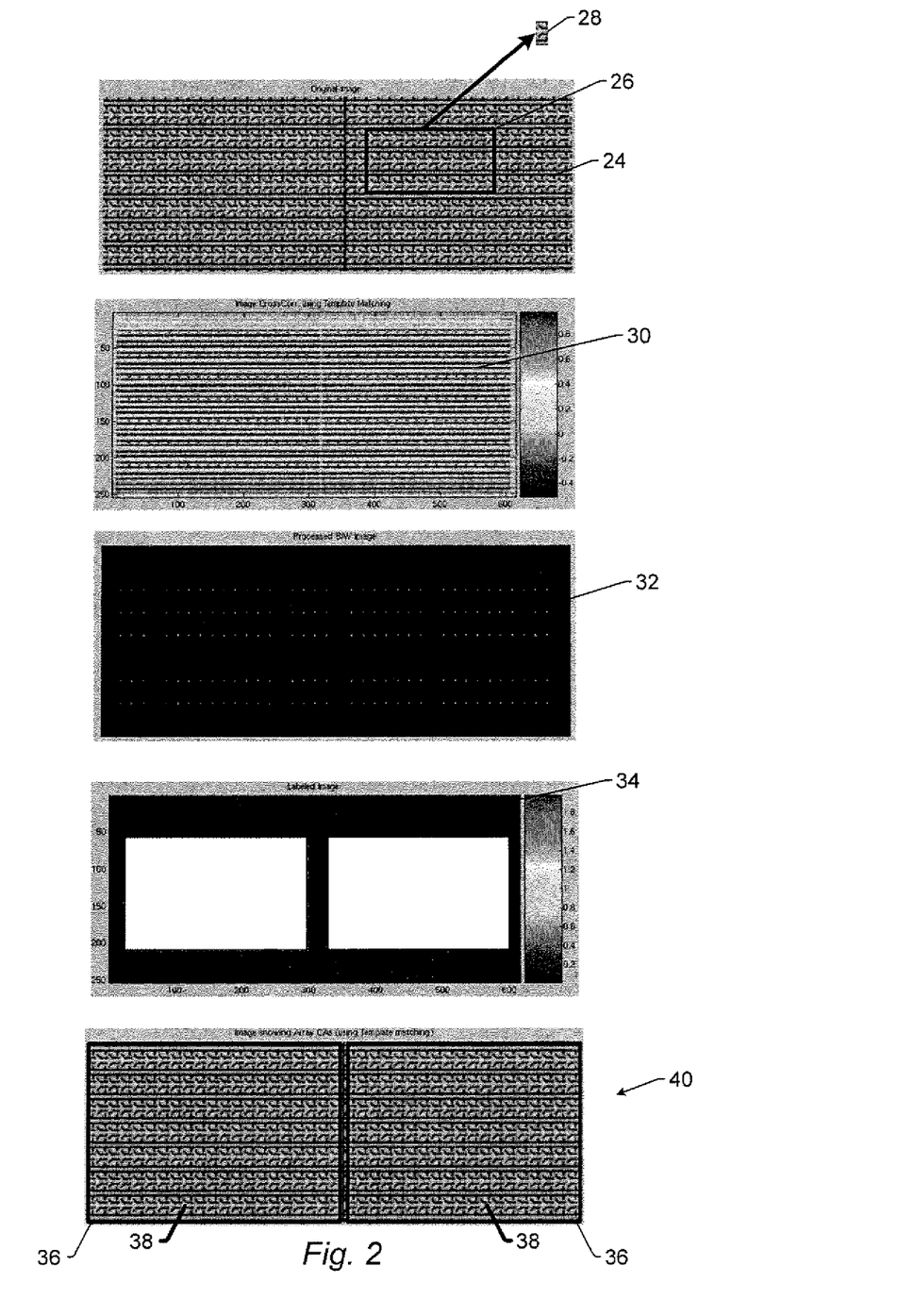
FIG. 2 includes examples of various images after different steps of one embodiment of a computer-implemented method for identifying array areas in dies formed on a wafer.

In one embodiment, the method may perform the comparing step described above using the core array detection algorithm and data flow for the template matching algorithm (used for array patterns that can be resolved) to perform the following steps. Image 24 shown in FIG. 2 is one example of an image that includes relatively well-resolved array patterns. As shown in FIG. 2, a user may select training array region 26 within image 24 as the training block. In one embodiment, the algorithm may automatically extract template image 28 from training array region 26. Template image 28 may have a width and height approximately equal to the width and height, respectively, of a cell in the array region. The template image of the array pattern having a width approximately equal to the horizontal (x) dimension of a cell in the array areas and a height approximately equal to the vertical (y) dimension of the cell may be provided as input to the finding phase of the algorithm. The width and height of the template image may be determined during the training phase of the method that includes training the algorithm.

The comparing step may include performing NCC of the search area image with the template image and generating an NCC image having peak coefficient values at periodic distances in x and y. For example, if image 24 is used as the search area image, the algorithm may perform NCC of substantially the entire image 24 using template image 28. In one such example, the results of NCC performed using template matching may include image 30 of the cross correlation. The peak coefficient values in image 30 may correspond to areas in the search area image that substantially match the array pattern in the template image. In other words, the peaks found in the array region are due to relatively high correlation.

Using pattern matching technology provides the method embodiments described herein with flexibility and robustness that other array-metric or attribute based care area setup schemes do not have. Using pattern matching technology as described herein, therefore, provides the ability to more precisely determine areas in the search area image in which array patterns are formed that substantially match the array pattern in the template image.

The method also includes determining areas in the search area image in which a pattern is formed that substantially matches the array pattern in the template image based on results of the comparing step. In one embodiment, the comparing step includes pattern matching, which may be performed as described above. In one such embodiment, the determining step includes applying a threshold to results of the pattern matching. In some embodiments, the method includes determining appropriate threshold values to be applied to the results of the comparing step. In one such embodiment, the method includes automatically determining appropriate threshold value(s) for pattern matching, which may be performed during the training scan. Determining the appropriate threshold value(s) may be performed as described further herein or in any other suitable manner.

In some embodiments, the method includes using the core array detection algorithm and data flow for the template matching algorithm or method (used for array patterns that can be resolved) to perform the following steps in the determining step described above. In particular, the NCC image generated in the comparing step as described above may be compared to a threshold (e.g., using an optimal threshold value, which may be determined as described above) to generate a binary image showing white dots against a black background at peak locations. For example, cross correlation image 30 shown in FIG. 2 may be binarized after thresholding the correlation values to produce black and white image 32. Filled rectangles or squares (e.g., all pixel values in the rectangle equal to 1) having a width approximately equal to a width of the template image and a height approximately equal to a height of the template image may be drawn using the white dots as the center of the filled rectangles. This step produces a binary image (as shown in image 34) in which the white region(s) represent the "seed array rectangle(s)".

The location and dimensions of one or more seed array rectangles may be determined using connected component labeling of the binary image. For example, peaks separated by approximately the cell size may be connected to generate a binary image (as shown in image 34). Connected component labeling may then be used to detect connected regions and their bounding boxes in a binary image such as labeled image 34 shown in FIG. 2. Connected component labeling of the binary image may be performed in any suitable manner known in the art.

The determining step may, therefore, include determining multiple areas in the search area image in which a pattern is formed that substantially matches the array pattern in the template image. In this manner, the comparing step may include scanning the search area image with the template image, and the determining step may include identifying multiple instances of the array pattern in the search area image.

The method further includes identifying the array areas in the dies formed on the wafer based on results of the determining step. In one embodiment, the identifying step includes determining a difference histogram using one or more of the areas in the search area image located at different positions in the search area image, determining a threshold based on the difference histogram, determining the areas in the search area image in which a pattern is formed that substantially matches the array pattern in the template image based on results of the comparing step using the optimal threshold (which may be determined in the training scan), and expanding one or more of the areas in the search area image using the threshold determined from the difference histogram.

In one such embodiment, the method includes using the core algorithm and data flow for the template matching algorithm (used for array patterns that can be resolved) to perform the following steps in the identifying step described above. In particular, a difference histogram may be determined in both the x and y directions using the seed array rectangles by taking the difference of an original image and a shifted image. The shifted image may be shifted from the original image in x by approximately the cell size dimension in the x direction and in y by approximately the cell size dimension in the y direction. These difference histograms (in the x and y directions) may be used to generate optimal threshold values that can be used in the next stage in which the seed array rectangles are further expanded to determine the "true" array area edge boundaries. In this manner, a bounding box may be further expanded in the x and y directions to determine the "true" array edges using difference image profiles. For instance, expanded bounding boxes 36, which may be determined as described above, corresponds to the edges of array areas 38 shown in image 40 of FIG. 2. After the seed array rectangle(s) are expanded, a final list of rectangles corresponding to the array areas may be generated as output. The array edges and/or bounding boxes such as that shown in image 40 may also be used to determine the care areas for the array areas as described further herein.

In some embodiments, the method includes filtering out any "false" array rectangles, which have dimensions smaller than the dimensions of the smallest array area, included in the search area. For example, the dimensions of the smallest array area may be determined using the design data, information about the process or processes used to form the array blocks on the wafer, information about the search area on the wafer, any other relevant information, or some combination thereof. The dimensions of the expanded array rectangles may be determined in any suitable manner and may be compared to the dimensions of the smallest array area in any suitable manner. In this manner, any areas in the search area image that are identified as array areas but are actually located in non-array areas of the dies may be eliminated from the final list of the rectangles thereby improving the accuracy of the methods described herein.

In another embodiment, the identifying step includes projecting the areas in the search area image onto an axis and determining discontinuities in the areas projected onto the axis as page breaks extending in a direction substantially perpendicular to the axis. In this manner, the method may include converting array rectangles (e.g., the expanded seed array rectangle(s)) to page breaks using projection. Identifying the page breaks may be used to indirectly identify the array areas based on the assumption that horizontal and vertical page breaks within the search area are substantially rectangular and extend through the entire width and height of the search area, respectively. In this manner, the method may include converting the rectangles corresponding to the array pattern to page breaks by projecting the rectangles onto the horizontal or vertical axis (depending on whether the method is identifying vertical or horizontal page breaks, respectively) and then finding the discontinuities in the lines resulting from the projection of the rectangles.

However, in other embodiments, the array areas in the dies may be identified without projecting the areas (e.g., the expanded areas) in the search area image onto an axis. For example, the embodiments may include generating an image of the areas (e.g., the expanded areas) in the search area image and using an algorithm such as a pattern recognition algorithm to detect the spaces between the areas in the search area image as the page breaks thereby effectively identifying the array areas in the dies.

In the embodiments described herein, therefore, the method may include identifying rectangles of array pattern in a horizontal and/or vertical swath of a search area image in order to identify vertical and/or horizontal page breaks, respectively (e.g., using the core array detection algorithm). However, such an identifying step may not work if the assumption that the page breaks are rectangular and extend through the entire dimensions of the search area image does not hold up. For cases in which this assumption about the page breaks does not hold, a different embodiment includes scanning the entire search area (e.g., selected by the user) using the template image, which may be performed as described herein, and identifying rectangles corresponding to the array pattern, which may be performed as described herein (e.g., using the core array detection algorithm). The embodiment may include directly reporting these rectangles without performing any kind of projection onto the x or y axis (such as that described above). The reported rectangles may then be used as the care areas for inspection of the wafer in array mode.

As described above, therefore, identifying the array areas in the dies formed on the wafer may include identifying the care areas on the wafer for inspection in array mode. In addition, as described above, the search area image may include a horizontal swath image and/or a vertical swath image. In some embodiments, therefore, the care areas identified using the horizontal swath may extend across a width that is approximately equal to the width of the search area and a height that is approximately equal to the height of the training block. In such embodiments, the care areas identified using the vertical swath may extend across a width that is approximately equal to the width of the training block and a height that is approximately equal to the height of the search area. These care areas can then be used to identify the care areas across the entire die for array mode inspection of the wafer (e.g., by extending the page breaks or non-care areas across the entire area of the die).

In one embodiment, all steps of the computer-implemented method described above are performed automatically. Each of the embodiments of the method described above may include any other step(s) of any other method(s) described herein. The embodiments of the method described above may be performed by any of the systems described herein.

Figure 3:
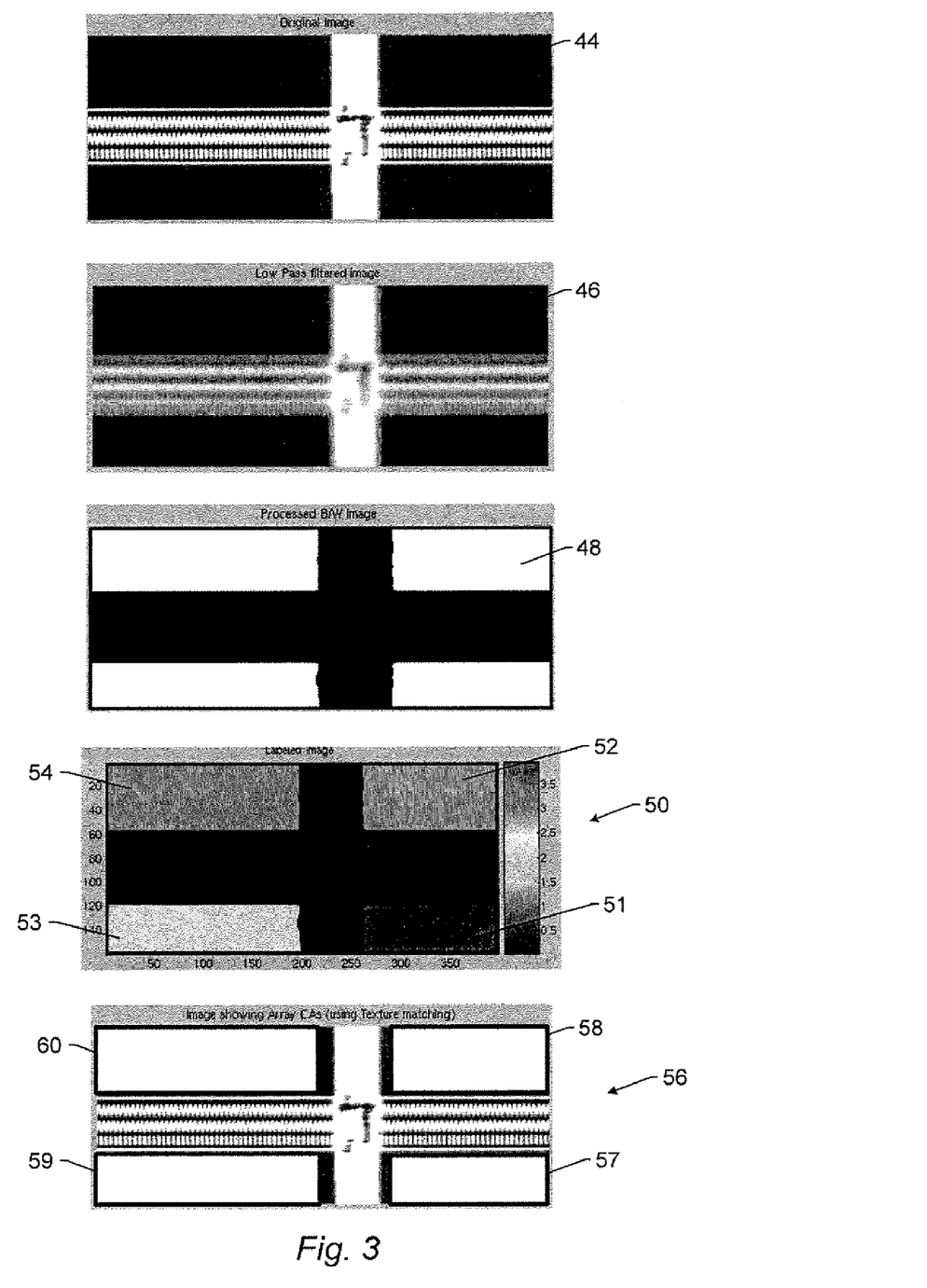
FIG. 3 includes examples of various images after different steps of another embodiment of a computer-implemented method for identifying array areas in dies formed on a wafer.

Another embodiment relates to a different method for identifying array areas in dies formed on a wafer. In some embodiments, the method includes acquiring one or more training images and one or more search area images for the wafer. For example, as shown in FIG. 3, a user may select training block within image 44 acquired for the wafer. The user may select the training block as described further herein. Image 44 may be acquired as described herein. The one or more training images and the one or more search area images may also be acquired as described herein. For example, in one embodiment, the method includes acquiring the one or more search area images by acquiring one or more swaths of image data in a first direction across the wafer and acquiring one or more swaths of image data in a second direction across the wafer. The second direction is substantially perpendicular to the first direction. Acquiring the one or more search area images in this manner may be performed as described further herein. In another embodiment, the method includes acquiring the one or more training images during a first scan of the wafer and acquiring the one or more search area images during a second scan of the wafer. Acquiring the one or more training images and the one or more search area images in this manner may be performed as described further herein.

In some embodiments, the one or more training images and the one or more search area images are acquired using BF imaging. Acquiring the training and search area images using BF imaging may be performed as described further herein.

The one or more training images and the one or more search area images may include any of the images described above. For example, in one embodiment, the one or more search area images include images of two or more of the array areas separated by one or more page breaks. However, in the embodiments described further herein, unlike the images used in the methods described above based on template matching, the array pattern is not resolved in the one or more training images and the one or more search area images. For example, as shown in FIG. 2, an array pattern is not resolved in image 44 of the wafer.

The method includes comparing one or more attributes of texture in one or more training images acquired in one of the array areas to one or more attributes of texture in one or more search area images acquired for the wafer. In this manner, the method may include using a texture matching algorithm for identifying unresolved array patterns in the one or more search area images. The one or more attributes of texture that are compared in this method may include any attribute(s) of texture that can be determined from the images. The attribute(s) of texture may be determined in any suitable manner using any suitable method and/or algorithm known in the art and may be compared in any suitable manner using any suitable method and/or algorithm known in the art.

Since the search area image(s) are image(s) of a larger area of the die than the training image(s), the comparing step may be performed such that the training image(s) can be compared to different areas within the search image(s). In this manner, the comparing step may effectively include scanning the one or more training images over the search area image(s). In other words, the method may include "sliding" the one or more training images around in the search area image(s) until all areas of the search area image(s) have been compared to the training image(s).

In one embodiment, the method includes filtering the one or more search area images prior to the comparing step to remove noise from the one or more search area images. In some embodiments, the method also includes filtering the one or more training images prior to the comparing step to remove noise from the one or more training images. For example, the method may include performing low pass filtering of the one or more search area images (or "the input image(s)") and/or the one or more training images (e.g., using a core array detection algorithm and data flow for the texture matching algorithm) to eliminate relatively high frequency noise. In one such example, image 44 shown in FIG. 3 may be low pass filtered to get rid of relatively high frequency noise to produce low pass filtered image 46. Low pass filtering of the search area image(s) and/or the training image(s) may be performed in any suitable manner using any suitable method and/or algorithm known in the art.

The method also includes determining areas in the one or more search area images in which the one or more attributes of the texture of the one or more search area images substantially match the one or more attributes of the texture of the training image(s) based on results of the comparing step. In one embodiment, the determining step includes comparing the results of the comparing step to one or more thresholds determined based on one or more statistics of the one or more attributes of the texture of the one or more training images, respectively. For example, the method may include determining statistics for one or more attributes of the texture (e.g., mean and/or range around a relatively small (e.g., about 7 pixels by about 7 pixels) neighborhood window) of the one or more training images (e.g., using the core array detection algorithm and data flow for the texture matching algorithm). For example, the algorithm may automatically extract statistics of mean and range attributes from the training block in low pass filtered image 46 shown in FIG. 2 using a window of about 7 pixels by about 7 pixels around any given pixel. Determining the statistics of the texture attributes may be performed during the training phase of the method and may be provided as input to the finding phase of the method described further herein.

In one such example, the method may include performing texture matching on the low pass filtered input image(s) (e.g., using the core array detection algorithm and data flow for the texture matching algorithm) by determining the texture attributes at every pixel in the input image(s) and applying the threshold(s) based on the texture attribute statistics generated during the training phase to the texture attributes at every pixel. For example, the mean/range attributes described above may be determined per pixel for low pass filtered image 46 shown in FIG. 3, and then the mean/range attributes may be thresholded based on the mean/range statistics determined in the training step to generate binary image 48 shown in FIG. 3. The thresholding may be performed by setting a pixel to "1" if the texture attributes of the pixel "match" the texture attribute statistics of the corresponding pixel in the training image and by setting the pixel to "0" if the texture attributes do no match. In other words, if the texture attributes of a pixel "match" the texture attribute statistics of the corresponding pixel in the training image, the method may include setting a value for the pixel to "1." In addition, if the texture attributes of a pixel do not match the texture attribute statistics of the corresponding pixel in the training image, the method may include setting a value for the pixel to "0." In this manner, the results of the thresholding step may be used to create binary image 48 of the search area image.

The determining step may include using the binary image to determine the areas in the search area image(s). For example, the binary image represents a list of possible "seed array rectangle(s)." In addition, the determining step may include identifying the location and dimensions of one or more seed array rectangles using connected component labeling of the binary image(s) (e.g., which may be performed using the core array detection algorithm and data flow for the texture matching algorithm). For example, connected component labeling may be used to detect connected regions and their bounding boxes in binary image 48 shown in FIG. 3 to produce labeled image 50 shown in FIG. 3. Labeled image 50 includes bounding boxes 51, 52, 53, and 54 that were detected in binary image 48. Connected component labeling of the binary image(s) may be performed in any suitable manner known in the art.

The method also includes identifying the array areas in the dies formed on the wafer based on results of the determining step. In one embodiment, the identifying step includes determining one or more difference histograms using one or more of the areas in the one or more search area images located at different positions in the one or more search area images, determining one or more thresholds based on the one or more difference histograms, performing determining the areas in the one or more search area images in which one or more texture attributes substantially match the one or more texture attributes in the one or more training images based on results of the comparing step using the one or more thresholds determined using the texture attribute statistics during the training phase (e.g., based on one or more statistics of the one or more attributes of the texture in the one or more training images), and expanding one or more of the areas in the one or more search area images using the one or more thresholds determined using the one or more difference histograms. For example, the method may include determining a difference histogram in both the x and y directions using the seed array rectangles by determining the difference between the original image and a shifted image (e.g., shifted by a few pixels (such as about 8 pixels or less)). The method may perform such determining using the core array detection algorithm and data flow for the texture matching algorithm. The method may include using the difference histograms to generate optimal threshold values to be used for further expanding the seed array rectangles to determine the "true" array edge boundaries. For example, as shown in FIG. 3, bounding boxes 51, 52, 53, and 54 shown in labeled image 50 may be expanded in the x and y directions to determine the "true" array edges using the difference image profiles to produce image 56 showing expanded bounding boxes 57, 58, 59, and 60. After the seed array rectangle(s) is(are) expanded, the method may include generating a final list of rectangles corresponding to the array pattern as output.

In another embodiment, the identifying step includes projecting the areas in the one or more search area images onto an axis and determining discontinuities in the areas projected onto the axis as page breaks extending in a direction substantially perpendicular to the axis. For example, identifying the page breaks indirectly results in identifying the array areas based on the assumption that horizontal and vertical page breaks within the search area image(s) are substantially rectangular and extend through the entire width and height of the search area image(s), respectively. In one such example, the method may include converting the rectangles corresponding to the array pattern in the search area image(s) to page breaks by projecting the rectangles onto the horizontal or vertical axis (depending on whether the method is identifying vertical or horizontal page breaks, respectively) and then identifying the discontinuities in the lines resulting from the projection of the rectangles.

However, in other embodiments, the areas in the search area image(s) are not projected onto an axis. For example, the embodiments may include generating an image of the areas in the search area image(s) and using an algorithm such as a pattern recognition algorithm to detect the spaces between the areas in the search area image(s) as the page breaks thereby effectively detecting the array areas in the dies.

In the embodiments described herein, therefore, the method may include identifying rectangles of array pattern in one or more horizontal and/or vertical swaths of one or more search area images in order to identify vertical and/or horizontal page breaks, respectively (e.g., using the core array detection algorithm). However, such an identifying step may not work if the assumption that the page breaks are rectangular and extend through the entire dimensions of the search area image(s) does not hold up. For cases in which this assumption about the page breaks does not hold, a different embodiment includes scanning the entire search area (e.g., selected by the user) using the one or more training images, which may be performed as described herein, and identifying rectangles corresponding to the array pattern (e.g., using the core array detection algorithm), which may be performed as described herein. The embodiment may include directly reporting these rectangles without performing any kind of projection onto the x and/or y axis (such as that described above). The reported rectangles may then be used as the care areas for inspection of the wafer in array mode.

In some embodiments, the method includes filtering out any false array rectangles, which have dimensions smaller than the dimensions of the smallest array area, included in the search area. Such filtering may be performed as described herein.

As described above, therefore, identifying the array areas in the dies formed on the wafer may include identifying the care areas on the wafer for inspection in array mode. In addition, as described above, the search area image(s) may include one or more horizontal swath images and/or one or more vertical swath images. In some embodiments, therefore, the care areas identified using the one or more horizontal swaths may extend across a width that is approximately equal to the width of the search area and a height that is approximately equal to the height of the training block. In such embodiments, the care areas identified using the one or more vertical swaths may extend across a width that is approximately equal to the width of the training block and a height that is approximately equal to the height of the search area. These care areas can then be used to identify the care areas across the entire die of the wafer for array mode inspection of the wafer (e.g., by extending the page breaks or do not care areas across the entire die of the wafer).

In one embodiment, all steps of the computer-implemented method are performed automatically. Each of the embodiments of the method described above may include any other step(s) of any other method(s) described herein. The embodiments of the method described above may be performed using any of the systems described herein.

The embodiment of the method described above may be performed using one or more training images and one or more search area images acquired using BF imaging. In a different embodiment, the one or more training images and the one or more search area images are acquired using dark field (DF) imaging. Acquiring the training and search area images using DF imaging may be performed as described further herein.

In one such embodiment, the one or more training images include different training images acquired in a training block on the wafer using different optical conditions, and the one or more search area images include different search area images acquired in a search area on the wafer using different optical conditions. For example, a DF wafer inspection system may be used to acquire multiple images of the training block under different optical conditions. In one embodiment, the different optical conditions include imaging with and without one or more Fourier filters. For example, during the training phase, the core algorithm may automatically determine the optics configuration to be used for acquiring the training images. The training block may be selected as described further herein. In addition, the search area may be selected as described herein.

Multiple training images and multiple search images may be used for identifying array areas in dies on a wafer for DF wafer inspection applications because unresolved patterns (inside and outside of the array areas) combined with relatively high system noise make it harder to distinguish the array areas from non-array areas in DF images than in BF images. However, DF wafer inspection systems such as those described further herein may include one or more Fourier filters that can be used to block the signal from the array patterns. In images of the array areas acquired using one or more Fourier filters, array areas look relatively similar to non-array (or blank) areas. By using two images of the array area, one acquired using one or more Fourier filters and the other without using a Fourier filter, the methods described herein can easily distinguish the array areas from the non-array areas as described further herein.

In this manner, multiple images (e.g., images acquired with one or more Fourier filters and without Fourier filters) may be used for automatic array detection for DF wafer inspection applications. Therefore, the core array detection algorithm used for images acquired by DF imaging may use an image combination algorithm to combine data from multiple images (in particular images acquired with and without Fourier filters) to improve the performance of automatic array detection in the presence of unresolved patterns and relatively high noise. The image combination algorithm may be configured to perform one or more of the steps described further herein.

The core algorithm for the image combination algorithm may perform the following steps (for images acquired using DF systems). For example, two or more training images of the training block may be acquired, at least one without Fourier filters and at least another with one or more Fourier filters. The statistics of the texture attributes (e.g., mean and/or range around a relatively small (e.g., about 7 pixels by about 7 pixels) neighborhood window) of each of the training images may be determined during the training phase of the algorithm and may be provided as input to the finding phase of the algorithm. The statistics of the texture attributes for each of the training images may be further determined as described herein. The training phase of this method may include any other steps of the training phase described herein. The images of the search area are also obtained with and without one or more Fourier filters. The images of the search area may be obtained during the finding phase.

Figure 4:
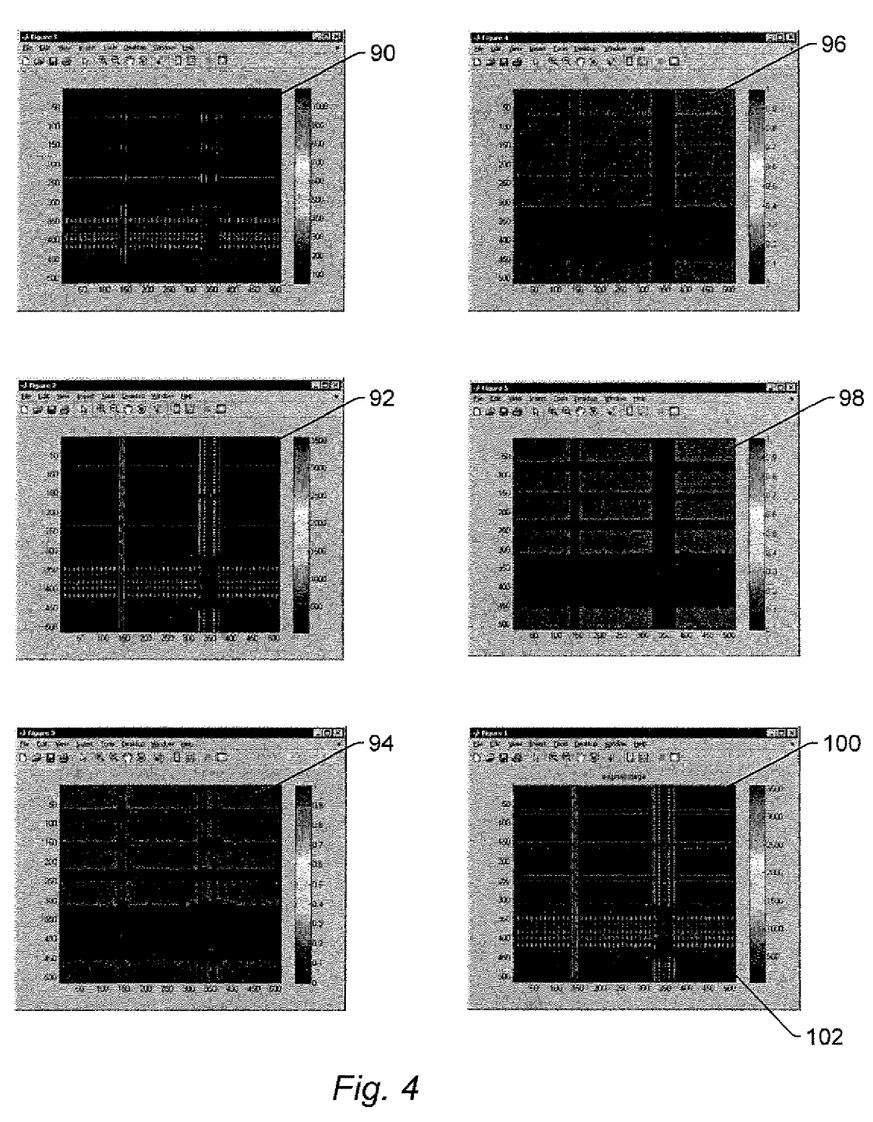
FIG. 4 includes examples of various images after different steps of an additional embodiment of a computer-implemented method for identifying array areas in dies formed on a wafer.

FIG. 4 illustrates examples of such images of a search area. For example, images 90 and 92 illustrated in FIG. 4 are examples of images of a search area acquired under different optical conditions. In particular, image 90 is an image of the search area acquired using one or more Fourier filters, and image 92 is an image of the search area acquired without using one or more Fourier filters.

In some such embodiments, the comparing step described above includes comparing the one or more attributes of the texture in a first of the different training images with the one or more attributes of the texture in a first of the search area images acquired at the same optical conditions and comparing the one or more attributes of the texture in a second of the different training images with the one or more attributes of the texture in a second of the search area images acquired at the same optical conditions. For example, the algorithm may perform texture matching by comparing each search area image with the corresponding training image. The thresholding for texture matching may be performed by setting a pixel to "1" if the texture attributes of any given pixel "match" the texture attribute statistics of the corresponding pixel in the training image and by setting the pixel to "0" if the texture attributes do not match thereby creating a binary image for each search area image and training image combination. For example, as shown in FIG. 4, image 94 is an image of the pixels satisfying the texture matching conditions for search area image 90. In addition, image 96 is an image of the pixels satisfying the texture matching conditions for search area image 92. Texture matching may be performed in this embodiment as described further herein.

In one such embodiment, the determining step described above includes determining the areas in both of the first and second different search area images in which the one or more attributes of the texture substantially match the one or more attributes of the texture in the first and second different training images, respectively. For example, using projections on the x and y axes, which may be performed as described further herein, approximate candidate rectangles may be determined. Only the candidate rectangles that occur in both of the search area images may be determined to be valid rectangles. In this manner, the method may include combining the results of the comparison performed using both images to find matches. In one such example, as shown in FIG. 4, image 98 may be produced by combining the results illustrated in both images 94 and 96. Therefore, image 98 illustrates the effects of combining the results of both of the images. The remaining rectangles are determined to be falsely detected rectangles and are eliminated. Since the signal from the array areas changes dramatically with Fourier filters, combining the results from the two images greatly improves reliability of the embodiments described herein for DF wafer inspection applications. In particular, the images acquired using different optical conditions can be used to find approximate rectangles corresponding to the array areas in the dies formed on the wafer with relatively high accuracy.

In some such embodiments, the identifying step includes identifying substantially accurate boundaries of rectangles corresponding to the array areas in the dies formed on the wafer based on the results of the determining step and only one of the different search area images. For example, substantially accurate boundaries of the rectangles may be determined using only one of the search area images thereby ensuring that any relatively small misalignment between the images with and without Fourier filters does not affect the care area position accuracy. In the example shown in FIG. 4, image 100 illustrates substantially accurate boundaries of rectangles 102 corresponding to the array areas in a dies formed on the wafer based on the results of the determining step and only one of the different search area images. Therefore, image 100 illustrates the final identified areas. As such, the identifying step may refine the approximate rectangles found in the determining step to identify the array areas formed on the wafer with relatively high accuracy (e.g., to within one or two pixels). The image used for the identifying step may be selected by the computer-implemented method (e.g., automatically) or by the user. In addition, the image used for the identifying step may vary depending on, for example, one or more characteristics of the water. After the seed array rectangle(s) is(are) expanded, a final list of rectangles specifying the array pattern may be generated as output.

In one embodiment, all steps of the computer-implemented method are performed automatically. Each of the embodiments of the method described above may include any other step(s) of any other method(s) described herein. The embodiments of the method described above may be performed using any of the systems described herein.

All of the methods described herein can be performed during inspection of the wafer. For example, the training and template images described above may be used in-line during inspection to set up the care areas. In one such example, the embodiments may include using the core array detection algorithm described herein during runtime while performing defect detection. At runtime, the method may include using the core array detection algorithm to automatically identify rectangles in the search area image(s) corresponding to the array pattern and then defect detection may be performed on these automatically detected rectangles. Therefore, the runtime approach completely eliminates the need to setup care areas for array region/geometry during recipe setup.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method finishes the array area identification, the method may include displaying the identified array areas for user verification. In another example, after the method identifies the array areas, the array areas may be stored in an inspection recipe that can be used to inspect other wafers on which the same device is being fabricated. In one such example, the array areas may be stored in a portion of the inspection recipe that includes instructions for performing array mode inspection of the wafers. In an additional example, the array areas may be stored in a storage medium of a wafer inspection system such that the wafer inspection system can access the array area information to perform a wafer inspection process and/or to setup a wafer inspection recipe based on the array area information. Furthermore, the results may be stored "permanently," "semi-permanently," temporarily, or for some period of time. For example, the storage medium may be random access memory (RAM), and the results may not necessarily persist indefinitely in the storage medium.

The embodiments described herein have a number of advantages over other currently used methods and systems for identifying array areas in dies formed on a wafer. For example, the embodiments described herein allow users to automatically setup thousands of care areas for array region/geometry in just a few minutes thereby reducing the overall recipe setup time by orders of magnitude (from hours to a few minutes) and increasing the array areas included in the inspected area as compared to other methods for manually setting up care areas.

Figure 5:
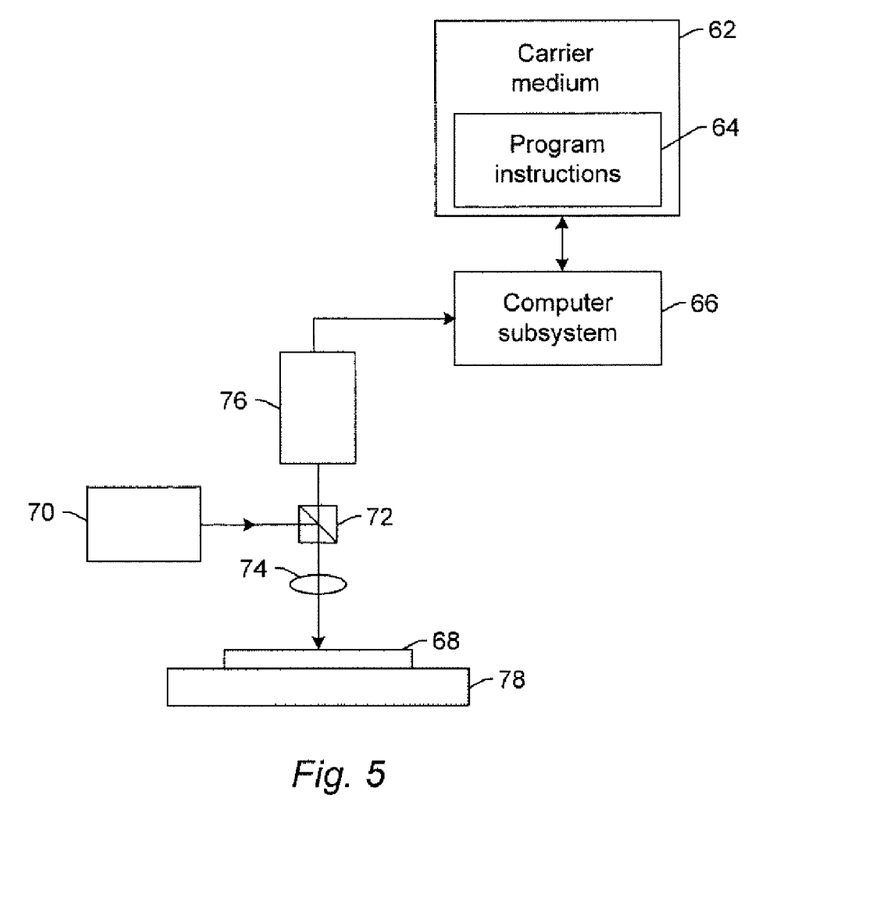
FIGS. 5-6 are schematic diagrams illustrating a cross-sectional view of different embodiments of a carrier medium and a system configured to perform one or more of the computer-implemented methods described herein.

FIG. 5 illustrates one embodiment of carrier medium 62. Carrier medium 62 includes program instructions 64 executable on a computer system (e.g., computer subsystem 66) for performing one or more of the computer-implemented method embodiments described herein. The one or more computer-implemented methods for which the program instructions are executable may include any step(s) of any of the method(s) described herein. The step(s) of the computer-implemented method(s) for which the program instructions are executable may be performed as described further herein.

The carrier medium may be a transmission medium such as a wire, cable, or wireless transmission link. The carrier medium may also be a storage medium such as a read-only memory, a random access memory, a magnetic or image acquisition disk, or a magnetic tape.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

The computer system and computer subsystem 66 may take various forms, including a personal computer system, mainframe computer system, workstation, image computer or any other device known in the art. In general, the term "computer system" may be broadly defined to encompass any device having one or more processors, which executes instructions from a memory medium.

FIG. 5 also illustrates one embodiment of a system configured to perform one or more of the computer-implemented methods described herein. The system shown in FIG. 5 includes an inspection subsystem. It is noted that FIG. 5 is provided herein to generally illustrate one embodiment of a configuration for an inspection subsystem that may be included in the system. Obviously, the system configuration described herein may be altered to optimize the performance of the system as is normally performed when designing a commercial inspection system. In addition, the systems described herein may be implemented using an existing inspection subsystem (e.g., by adding functionality described herein to an existing inspection system). For some such systems, the methods described herein may be provided as optional functionality of the system (e.g., in addition to other functionality of the system). Alternatively, the system described herein may be designed "from scratch" to provide a completely new system.

The inspection subsystem is configured to acquire one or more of the images described herein of wafer 68. The inspection subsystem includes light source 70. Light source 70 may include any appropriate light source known in the art. Light generated by light source 70 is directed to beam splitter 72. Beam splitter 72 is configured to direct the light from light source 70 to objective 74. Beam splitter 72 may include any appropriate beam splitter known in the art. Objective 74 is configured to focus the light from beam splitter 72 to the wafer. Although objective 74 is shown in FIG. 5 as a single refractive optical element, it is to be understood that objective 74 may include one or more refractive optical elements and/or one or more reflective optical elements.

As shown in FIG. 5, the inspection subsystem is configured to illuminate the wafer by directing the light to the wafer at a substantially normal angle of incidence. However, in other embodiments (not shown), the inspection subsystem may be configured to illuminate the wafer by directing the light to the wafer at an oblique angle of incidence.

In the embodiment shown in FIG. 5, objective 74 is configured to collect light reflected from the wafer. Light collected by objective 74 passes through beam splitter 72 and is directed to detector 76 of the inspection subsystem. Detector 76 is configured to detect light transmitted by beam splitter 72. The inspection subsystem may include one or more optical components (not shown) such as a focusing or imaging lens disposed in the optical path between beam splitter 72 and detector 76. Detector 76 is configured to generate images (e.g., any of the images described herein) responsive to the light reflected from the wafer. Detector 76 may be any appropriate detector known in the art such as a charge coupled device (CCD) and a time delay integration (TDI) camera.

The inspection subsystem shown in FIG. 5 is, therefore, configured to generate images responsive to light specularly reflected from the wafer. Therefore, the inspection subsystem is configured as a BF imaging based inspection subsystem. However, in other embodiments, the optical inspection subsystem may be replaced by an electron beam inspection subsystem (not shown). The electron beam inspection subsystem may be configured to generate the images described herein. Examples of commercially available electron beam inspection subsystems that may be included in the system of FIG. 5 include the electron beam subsystems that are included in the eDR5000 system, the eCD-1 system, and the eS25 and eS30 systems, which are commercially available from KLA-Tencor, San Jose, Calif.

The system may be configured to acquire the images in the embodiments described above manually, automatically, or semi-automatically (e.g., user-assisted). In one embodiment, the inspection subsystem may be configured to acquire the images by imaging specific areas on the wafer. For instance, the system may include computer subsystem 66, which may be configured to estimate a location of an array pattern on a wafer based on the design of the device and any other relevant information described herein. The computer subsystem may be configured to estimate the location as described further herein. The computer subsystem may be configured to position the field of view of the inspection subsystem at the estimated location. Alternatively, the computer subsystem may be configured to provide the estimated location to the inspection subsystem, which may be configured to position its field of view above the estimated location. The inspection subsystem may then acquire an image at the estimated location.

Detector 76 is coupled to computer subsystem 66. Computer subsystem 66 may be coupled to detector 76 such that the computer subsystem can receive the images generated by the detector. For example, computer subsystem 66 may be coupled to the detector by a transmission medium (not shown) or an electronic component (not shown) interposed between the detector and the computer subsystem. The transmission medium and the electronic component may include any suitable such medium and component known in the art. Computer subsystem 66 may be configured to perform one or more steps of one or more methods described herein using images acquired by the inspection subsystem.

The system shown in FIG. 5 may also include carrier medium 62 and program instructions 64. The carrier medium and the program instructions may be configured as described above. In addition, the carrier medium may include program instructions executable on a computer system of any other inspection system that can be configured as described herein.

The system may also include stage 78 on which wafer 68 may be disposed during inspection. Stage 78 may include any suitable mechanical or robotic assembly known in the art. Scanning the wafer may be performed in any manner known in the art. The system shown in FIG. 5 may be further configured as described herein (e.g., according to any other embodiments described herein).

Figure 6:
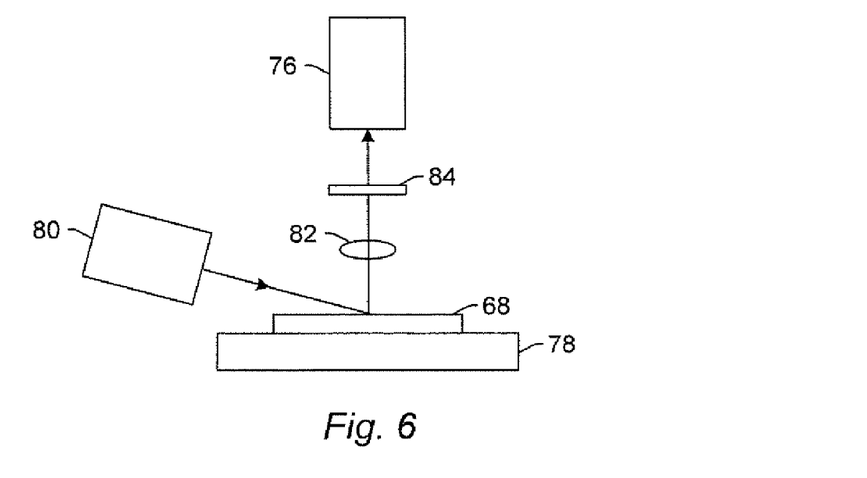

As described above, the inspection subsystem may be configured as a BF imaging based inspection subsystem. However, in other embodiments, the inspection subsystem is configured as a DF imaging based inspection subsystem. FIG. 6 illustrates one embodiment of a DF imaging based inspection subsystem that may be included in the systems described herein.

In this embodiment, the inspection subsystem includes light source 80. Light source 80 is configured to direct light to wafer 68 at an oblique angle of incidence. However, in other embodiments, the light source and the inspection subsystem may be configured such that light from the light source is directed to the wafer at a substantially normal angle of incidence. Light source 80 may include any suitable light source known in the art.

Light scattered from wafer 68 is collected by objective 82. Objective 82 may be configured as described above. Although objective 82 is shown in FIG. 6 as being positioned to collect light scattered at angles relatively close to normal, it is to be understood that the scattered light used for DF imaging in the systems described herein may be collected at any suitable scattering angle(s), which may vary depending on, for example, the angle of incidence and one or more characteristics of patterned features formed on the wafer.

Objective 82 directs the collected scattered light to Fourier filter 84. Fourier filter 84 may include any suitable Fourier filter known in the art. In addition, the inspection subsystem may be configured such that the Fourier filter may be moved into and out of the optical path of the inspection subsystem depending on which images are being acquired (e.g., training and search area images acquired with or without the Fourier filter as described herein).

Light that passes through Fourier filter 84 is directed to detector 76, which may be configured as described herein. The inspection subsystem shown in FIG. 6 and a system that includes such an inspection subsystem may be further configured as described herein. In addition, the systems described herein may include an existing DF wafer inspection subsystem such as those included in the Puma 90xx, 91xx, and 93xx series wafer inspection systems that are commercially available from KLA-Tencor.

Further modifications and alternative embodiments of various aspects of the invention may be apparent to those skilled in the art in view of this description. For example, methods for identifying array areas in dies formed on a wafer and methods for setting up such methods are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for identifying array areas in dies formed on a wafer, comprising:

comparing an array pattern in a template image acquired in one of the array areas to a search area image acquired for the wafer;

determining areas in the search area image in which a pattern is formed that substantially matches the array pattern in the template image based on results of said comparing; and     identifying the array areas in the dies formed on the wafer based on results of said determining, wherein said identifying comprises projecting the areas in the search area image onto an axis and determining discontinuities in the areas projected onto the axis as page breaks extending in a direction substantially perpendicular to the axis, and wherein said comparing, said determining the areas, and said identifying are performed using a computer system, wherein said identifying further comprises determining a difference histogram using one or more of the areas in the search area image located at different positions in the search area image, determining a threshold based on the difference histogram, and expanding one or more of the areas in the search area image using the threshold.

2. The method of claim 1, wherein the array pattern is resolved in the template image.

3. The method of claim 1, wherein said comparing comprises pattern matching, and wherein said determining the areas comprises applying a threshold to results of the pattern matching.

4. The method of claim 1, further comprising acquiring the search area image by acquiring a swath of image data in a first direction across the wafer and acquiring a swath of image data in a second direction across the wafer, wherein the second direction is substantially perpendicular to the first direction.

5. The method of claim 1, further comprising acquiring the template image during a first scan of the wafer and acquiring the search area image during a second scan of the wafer.

6. The method of claim 1, wherein the search area image comprises images of two or more of the array areas separated by one or more of the page breaks.

7. The method of claim 1, wherein all steps of the computer-implemented method are performed automatically.

8. The method of claim 1, wherein the template image and the search area image are acquired using bright field imaging.

9. A system configured to identify array areas in dies formed on a wafer, comprising:
  an inspection subsystem configured to acquire a template image in one of the array areas and a search area image for the wafer; and
  a computer subsystem configured to compare an array pattern in the template image to the search area image, to determine areas in the search area image in which a pattern is formed that substantially matches the array pattern in the template image based on results of the comparison, and to identify the array areas in the dies formed on the wafer based on results of the determination, wherein identifying the array areas comprises projecting the areas in the search area image onto an axis and determining discontinuities in the areas projected onto the axis as page breaks extending in a direction substantially perpendicular to the axis, wherein said identifying further comprises determining a difference histogram using one or more of the areas in the search area image located at different positions in the search area image, determining a threshold based on the difference histogram, and expanding one or more of the areas in the search area image using the threshold.

* * * * *